Feb. 7, 1961 R. BERANGER 2,970,761

DIGIT INDICATOR

Filed Oct. 9, 1958 2 Sheets-Sheet 1

INVENTOR
RAYMOND BERANGER
BY
Frank R. Trifari
AGENT

| | J | $B_1$ | $B_2$ | $B_3$ | $B_4$ | $G_1$ | $G_2$ | $G_3$ |
|---|---|---|---|---|---|---|---|---|
| 0 | i | 1 | 0 | 0 | 0 | − | − | − |
| | i' | 0 | 1 | 0 | 0 | − | − | − |
| 1 | i | 0 | 1 | 0 | 0 | − | − | − |
| | i' | 1 | 1 | 0 | 0 | − | − | − |
| 2 | i | 1 | 1 | 0 | 0 | − | − | − |
| | i' | 0 | 0 | 1 | 0 | − | − | − |
| 3 | i | 0 | 0 | 1 | 0 | − | − | − |
| | i' | 1 | 0 | 1 | 0 | − | − | − |
| 4 | i | 1 | 0 | 1 | 0 | − | − | − |
| | i' | 0 | 1 | 1 | 0 | + | − | − |
| 4 | i | 1 | 0 | 1 | 1 | − | − | + |
| | i' | 0 | 0 | 1 | 1 | − | − | + |
| 3 | i | 0 | 0 | 1 | 1 | − | − | + |
| | i' | 1 | 1 | 0 | 1 | − | − | + |
| 2 | i | 1 | 1 | 0 | 1 | − | − | + |
| | i' | 0 | 1 | 0 | 1 | − | − | + |
| 1 | i | 0 | 1 | 0 | 1 | − | − | + |
| | i' | 1 | 0 | 0 | 1 | − | − | + |
| 0 | i | 1 | 0 | 0 | 1 | − | − | + |
| | i' | 0 | 0 | 0 | 1 | − | + | + |
| 0 | i | 1 | 0 | 0 | 0 | − | − | − |
| | i' | 0 | 1 | 0 | 0 | − | − | − |
| 1 | i | 0 | 1 | 0 | 0 | − | − | − |

FIG. 3

INVENTOR
RAYMOND BERANGER
BY
Frank R. Jufari
AGENT

United States Patent Office 2,970,761

Patented Feb. 7, 1961

2,970,761

DIGIT INDICATOR

Raymond Beranger, Paris, France, assignor to North American Philips Company, Inc., New York, N.Y., a corporation of Delaware Filed Oct. 9, 1958, Ser. No. 766,312

Claims priority, application France Nov. 4, 1957

3 Claims. (Cl. 235—92)

This invention relates to a digit indicator comprising a shift register having five output terminals and ten indicating members. A voltage is at all times applied to selected ones of the output terminals. The indicating members which, when appropriately energized, show one of the digits 0, 1, 2, 3, 4, 5, 6, 7, 8 or 9 respectively. Each output terminal is connected to two indicating members, and the supply circuits of the two indicating members connected to the same output terminal can be completed through a change-over switch in such a manner that of the ten indicating members only that one is energized which is connected to a voltage-carrying output terminal of the shift register and to a terminal of the supply circuit through the change-over switch. Such digit indicators are known from the U.S. patent specifications 2,436,963 and 2,521,787. However, in the digit indicators described in these specifications it is comparatively complicated to replace a digit indicated by the indicator by its 9-complement, an operaton which may be very useful when the indicator is used in a computer, especially for performing subtractions. If, for example, the subtraction 72831—34129 is to be performed, the correct answer is obtained by replacing this subtraction by the addition 27168+34129 (in which all digits of the minuend 72831 are replaced by their 9-complements), all the digits of the result of this addition being again replaced by their 9-complements. This manner of adding holds good even if the difference becomes negative, provided that the carry from the highest digit place is returned as input carry to the lowest digit place. This carry pulse can also be used to indicate that the result is negative.

It is an object of the present invention to obviate the above disadvantage of the prior art digit indicators. According to the invention, the two indicating members connected to the same output terminal of the shift register, when energized, indicate digits one of which is the 9-complement of the other, the shift register being designed so as to count forwards and backwards on receipt of a continuous pulse train and each time to remain in an extreme position twice in succession, while each time when an extreme position is reached twice in succession, a pulse is generated which switches over the change-over switch, while the digit indicated by the digit-indicator can be replaced by its 9-complement by switching over the change-over switches.

In order that the invention may be readily understood an embodiment thereof will now be described, by way of example, with reference to the accompanying drawings, in which—

Figure 1:
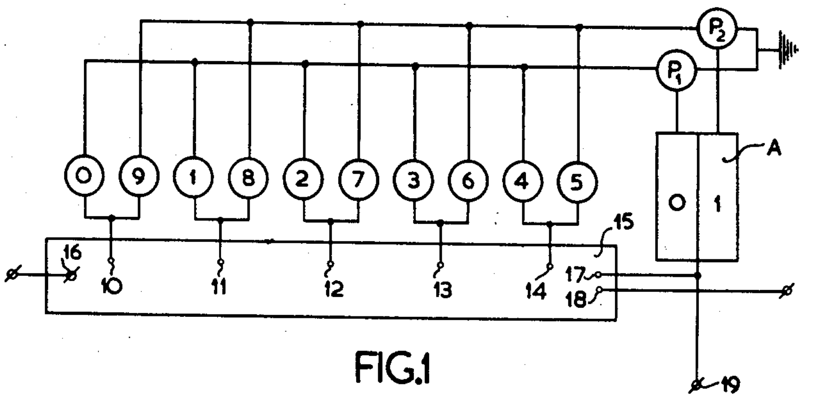
Figure 2:
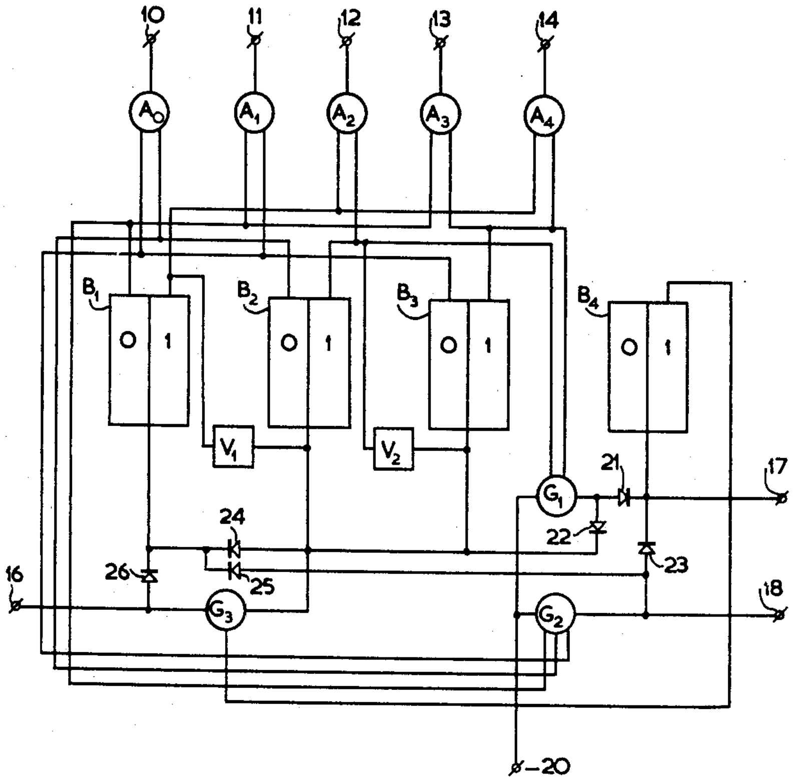

Fig. 1 is a block-schematic diagram of a digit indicator in accordance with the invention, Fig. 2 shows in more detail the circuit diagram of a shift register which can be used in the digit indicator, and Fig. 3 shows a table illustrating the operation of the shift register shown in Fig. 2.

In Fig. 1, reference numeral 15 denotes a shift register having an input terminal 16, a group of five output terminals 10, 11, 12, 13, 14 a separate output terminal 17 and a second separate output terminal 18. The shift register 15 must be such that it counts forwards and backwards if a continuous pulse train is applied to its input terminal 16; however, the register always remains twice in succession at the extreme output terminals 10 and 14. The expression "The shift register remains at a certain output terminal, for example, the output terminal 12" is to be understood to mean that the output terminal 12 has a voltage applied to it, all the remaining output terminals 10, 11, 13, 14 having no voltage applied to them. Thus, the reception of a continuous input pulse train sets up a voltage in sequence at the output terminals 13, 14, 14, 13, 12, 11, 10, 10, 11, 12, 13, 14, 14, 13 . . . . Furthermore, the shift register 15 must be such that an output pulse is produced at the separate output terminal 17 each time the shift register remains twice in succession at one of the two extreme output terminals 10 or 14, an output pulse being produced at the separate output terminal 18 each time the shift register remains twice in succession at the extreme output terminal 10.

Each of the output terminals 10, 11, 12, 13, 14 is connected to two indicating members, the output terminal 10 to an indicating member capable of showing the digit 0 and to an indicating member capable of showing the digit 9, the output terminal 11 to an indicating member capable of showing the digit 1 and to an indicating member capable of showing the digit 8, etc. Hence, the special feature of the invention is that the two indicating members connected to one output terminal can show digits one of which is the 9-complement of the other. In Fig. 1 the indicating members are shown as lamps; however, the specific form of the indicators is immaterial to the invention. If required, the lamps may be input terminals of an indicating member which, under the control of its current- or voltage-carrying input terminal, shows one of the ten digits 0, 1, 2, 3, 4, 5, 6, 7, 8 or 9.

The indicating members 0, 1, 2, 3 and 4 are also connected to a gate circuit $P_1$, while the indicating members 5, 6, 7, 8 and 9 are connected to a gate circuit $P_2$. The gate circuits $P_1$ and $P_2$ are controlled by a bistable trigger circuit A which in turn is controlled by the pulses produced at the separate output terminal 17, owing to the connection of the flip-over terminal of the trigger circuit to the terminal 17. The gates $P_1$ and $P_2$ together with the trigger circuit A constitute the above-mentioned change-over switch. Furthermore the assembly must be such that the shift register 15 counts to and fro, that is to say, that it counts forward (in the sequence 10, 11, 12, 13, 14) when the trigger circuit A is in the state 0 so that the gate $P_1$ is opened and the gate $P_2$ is closed, but counts backward (in the sequence 14, 13, 12, 11, 10) if the trigger circuit A is in the state 1 so that the gate $P_1$ is closed and the gate $P_2$ is opened. The flip-over terminal of the trigger circuit A is also connected to an input terminal 19 of the entire arrangement.

The digit indicator shown in Fig. 1 operates as follows. It is assumed that the indicator is in the position in which a voltage is set up at the terminal 12 and the trigger circuit A is in the state 1. The shift register then is in the counting backward condition. The gate $P_1$ is closed and the gate $P_2$ is opened, so that only the indicating member 7 is energized, that is to say, the digit indicator shows the digit 7. Now it is assumed that six input pulses are applied to the indicator. A voltage is set up in sequence at the terminals 11, 10, 10, 11, 12, 13, the register remaining in the state in which a voltage is set up at the terminal 13. When the third input pulse is received (that is to say, when the shift register remains at the terminal 10 for the second time), the separate output terminals 17 and 18 of the shift register 15 both deliver an output pulse. The pulse produced by the terminal 17 causes the trigger circuit A to flip-over so that it assumes the state 0, with the result that the gate $P_1$ is opened and the gate $P_2$ is closed. At the end of the train of six pulses the digit indicator consequently indicates the digit 3. The pulse produced at the separate output terminal 18 can be used as a carry pulse. This is in complete agreement with the addition $7+6=13$. The digit indicated by the digit indicator can be replaced by its 9-complement by applying a pulse to the input terminal 19.

Fig. 2 shows an embodiment of a shift register which counts forward and backward. This shift register comprises three bistable trigger circuits $B_1$, $B_2$, $B_3$, which are connected as a binary counting circuit. The 1-output of the trigger circuit $B_1$ and the flip-over terminal of the trigger circuit $B_2$ are interconnected through a delay element $V_1$, and similarly the 1-output of the trigger circuit $B_2$ and the flip-over terminal of the trigger circuit $B_3$ are interconnected through a delay element $V_2$. The shift register further comprises a fourth trigger circuit $B_4$, three gates $G_1$, $G_2$, $G_3$ and five "And"-gates $A_0$, $A_1$, $A_2$, $A_3$, $A_4$. The Gate $G_1$ is opened only if the trigger circuits $B_2$ and $B_3$ both are in the state 1, the gate $G_2$ only if all three trigger circuits $B_1$, $B_2$, $B_3$ are in the state 0, and the gate $G_3$ only if the trigger circuit $B_4$ is in the state 1. The circuit arrangement of the five "And"-gates $A_i$, the output terminals of which are the terminals 10, 11, 12, 13, 14 will be described more fully hereinafter. In addition to the input terminal 16 the shift register has a second input terminal 20 and the output terminal 18. The trigger circuit $B_4$ can also perform the function of the trigger circuit A of Fig. 1. The output terminal 17 is connected to a junction point of the circuit arrangement.

The pulses *i* to be counted are applied to the input terminal 16. Pulses *i'* are applied to the second input terminal 20, each pulse *i* being followed by a pulse *i'*. Hence, the pulses *i'* can be derived from the pulses *i* by means of a delay element; however, they may also be supplied by a pulse generator. The circuit arrangement furthermore is such that, if the Gate $G_1$ is open, a pulse *i'* is passed on to the flip-over terminals of all four trigger circuits $B_1$, $B_2$, $B_3$, $B_4$ and to the terminal 17. If the gate $G_2$ is open, a pulse *i'* is passed on to the flip-over terminals of the trigger circuits $B_1$ and $B_4$ and to the terminal 18. If the gate $G_3$ is open, a pulse *i* is passed on to the flip-over terminals of the three trigger circuits $B_1$, $B_2$, $B_3$ only. Every pulse *i* is passed on to the flip-over terminal of trigger circuit $B_1$. In the circuit arrangement shown, the noted operation is ensured by the provision of six diodes 21, 22, 23, 24, 25, 26 which, however, may be connected in a manner different from that shown in Fig. 2 and yet achieve the same result.

The operation of the shift register is illustrated by the table of Fig. 3. This table shows that the five states of the shift register are the states (100), (010), (110), (001) and (101), the symbol (100) indicating that $B_1$ is in the state 1 and $B_2$ and $B_3$ are in the state 0. The states (011) and (000) must be considered as transitional states. The states of the shift register are shown in Fig. 3 in the left-hand column by the digits 0, 1, 2, 3, 4. The shift register counts forward when the trigger circuit $B_4$ is in the state 0, and backward when the trigger circuit $B_4$ is in the state 1. This is due to the fact that in the former case the gate $G_3$ is closed and consequently the pulses *i* applied to the input terminal 16 can only reach the flip-over terminal of the trigger circuit $B_1$ through the diode 26. If, however, the gate $G_3$ is open the pulses *i* applied to the input terminal 16 reach the flip-over terminals of the trigger circuits $B_1$, $B_2$ and $B_3$. This means that each time $111=7$ is added to the number (in the binary scale of notation) stored in the shift register. Consequently counting back is based on the congruence $7+x=x-1$ (mod. 8). The gate $G_1$ serves to set the circuit arrangement twice in succession to the state 4 and also to flip over the trigger circuit $B_4$, while the gate $G_2$ serves to set the circuit arrangement twice in succession to the state 0 and also to flip-over the trigger circuit $B_4$.

By way of example, we will now follow in detail the procedure taking place when the circuit arrangement (in the forward direction) has reached the state 4 and then has a pulse *i* and a pulse *i'* applied to it in succession. The circuit arrangement is in the state $B_1=1$, $B_2=0$, $B_3=1$, $B_4=0$, which is indicated by the symbol (1010). All the gates $G_1$, $G_2$, $G_3$ are closed, which is designated in Fig. 3 by the sign —. A pulse *i* applied to the terminal 16 reaches the flip-over terminal of the trigger circuit $B_1$, which flips over so that the state (0010) is produced. The abrupt transition of the trigger circuit $B_1$ from the state 1 to the state 0 produces a pulse which, through the delay element $V_1$, is transmitted to the flip-over terminal of the trigger circuit $B_2$, so that this circuit flips over and the state (0110) is produced. Since now $B_2$ and $B_3$ are both in the state 1, the Gate $G_1$ is opened. If, now, a pulse *i'* is applied to the terminal 20, this pulse reaches the flip-over terminals of all the trigger circuits $B_i$, so that all these circuits flip-over and the state (1001) is produced, so that the gate $G_3$ is opened. The abrupt transition of $B_2$ from the state 1 to the state 0, however, again produces a pulse which, through the delay element $V_2$, is applied to the flip-over terminal of $B_3$, so that this circuit flips-over and the state (1011) is reached, the gate $G_1$ being again closed, but the gate $G_3$ remaining open. Hence, however, the shift register is again in the state 4, but now in the counting backwards condition owing to the fact that the gate $G_3$ now is open and consequently each pulse *i* reaches the flip-over terminals of the three trigger circuits $B_1$, $B_2$ and $B_3$. The next pulse *i* consequently sets the circuit to the state (0101); however, the abrupt transition of the trigger circuit $B_1$ from the state 1 to the state 0 produces a pulse which, through the delay element $V_1$, is applied to the flip-over terminal of the trigger circuit $B_2$, so that this circuit again flips over and the shift register is set to the state (0001). The transition of the trigger circuit $B_2$ from the state 1 to the state 0 in turn produces a pulse which, through the delay element $V_2$, is applied to the flip-over terminal of the trigger circuit $B_3$, so that this circuit also flips over again and the shift register settles down to the state (0011). However, this is the state 3. It will be appreciated that the delay time of the delay elements $V_1$ and $V_2$ must be at least equal to the flip-over time of the trigger circuits $B_i$, since otherwise a trigger circuit might have a pulse applied to its flip-over terminal before it had fully recovered from the previous transition. The next subsequent pulse *i'* has no effect since the gates $G_1$ and $G_2$ now are both closed. The other transitions can be followed in the same manner.

Each of the output terminals 10, 11, 12, 13, 14 of the shift register is connected, through an "And"-gate $A_0$, $A_1$, $A_2$, $A_3$, $A_4$, to two output terminals of two of the three trigger circuits $B_1$, $B_2$, $B_3$. From the table of Fig. 3 it will be seen that the combination $B_2=B_3=0$ is characteristic of the state 0. Therefore, the output terminal 10 is connected, through the "And"-gate $A_0$, to the 0-output terminals of the trigger circuits $B_2$ and $B_3$. In order to characterize the other states, use is made of the combinations $(B_1=B_3=0)$, $(B_1=B_2=1)$, $(B_1=0, B_3=1)$ and $(B_1=B_3=1)$.

What is claimed is:

1. A digit indicator comprising: a shift register having five output terminals and ten indicating members for exhibiting digits in the decimal system, only one of said output terminals delivering an output voltage at a given time, each output terminal being connected to two indicating members, a change-over switch, a supply source for said indicating members, any two indicating members connected to one output terminal being coupled to said supply source through said change-over switch, only a particular indicating member being energized which is connected to an output terminal delivering an output voltage and whose supply circuit is completed through the change-over switch, the two indicating members connected to one output terminal indicating digits one of which is the 9-complement of the other, means for applying a continuous pulse train to said shift register, the voltage on one output terminal moving to the next adjacent output terminal in a forward or backward direction on the receipt of each pulse of said train depending on the position of said change-over switch, said voltage remaining on the extreme forward output terminal and on the extreme backward output terminal during the receipt of two succeeding pulses of said train, while each time the second of said two pulses is received while the voltage is on the extreme forward or backward output terminal a pulse is produced which switches over the change-over switch, any digit indicated by the digit indicator being replaced by its 9-complement by the switching over of the change-over switch.

2. A digit indicator as claimed in claim 1, said change-over switch being common to all the indicating members.

3. A digit indicator as claimed in claim 1, said shift register comprising three bistable trigger circuits connected as a binary counting circuit, the incoming pulses being applied only to the flip-over terminal of the first bistable trigger circuit when the register counts forward, the incoming pulses being applied to the flip-over terminals of all three bistable trigger circuits when the register counts backward.

References Cited in the file of this patent

UNITED STATES PATENTS

| | | |
|---|---|---|
| 2,536,916 | Dickinson | Jan. 2, 1951 |
| 2,756,934 | Ziffer | July 31, 1956 |